United States Patent [19]
Sensi

[11] 4,299,612
[45] Nov. 10, 1981

[54] APPARATUS AND METHOD FOR ATTENUATING FLOAT GLASS

[75] Inventor: John E. Sensi, Arnold, Pa.

[73] Assignee: PPG Industries, Inc., Pittsburgh, Pa.

[21] Appl. No.: 174,480

[22] Filed: Aug. 1, 1980

[51] Int. Cl.³ ............................................. C03B 18/06
[52] U.S. Cl. .................................. 65/99 A; 65/182.3; 65/182.4
[58] Field of Search ................. 65/99 A, 182.3, 182.4

[56] References Cited

U.S. PATENT DOCUMENTS 3,520,672 7/1970 Greenler et al. ............... 65/99 A X
3,929,444 12/1975 May et al. ......................... 65/182.4

FOREIGN PATENT DOCUMENTS 218377 4/1970 U.S.S.R. ............................. 65/99 A

Primary Examiner—Arthur D. Kellogg
Attorney, Agent, or Firm—Lee Patch; Donald Carl Lepiane

[57] ABSTRACT

An edge engaging device for attenuating a ribbon of float glass having a single elongated barrel and a plurality of operatively interconnected edge rolls secured near one end thereof. The edge rolls are rotatable about a generally horizontal axis angularly related to the longitudinal center line of the elongated barrel, and means are provided to adjust the angular relationship thereof.

14 Claims, 5 Drawing Figures

APPARATUS AND METHOD FOR ATTENUATING FLOAT GLASS

FIELD OF THE INVENTION

This invention relates to apparatus for and a method of controlling the width and thickness of a ribbon of glass being formed by a float process, and more particularly to an attenuating apparatus for and method of engaging the marginal edge portion of the ribbon to control its width and thickness.

DISCUSSION OF THE TECHNICAL PROBLEM

It is known in the art of manufacturing flat glass to float a body of molten glass upon a pool of molten metal and translate it thereabout to form a continuous ribbon. An unrestricted body of molten glass adopts an equilibrium thickness of across 0.27 inch (0.636 cm) upon tin, the most commonly employed molten metal, and stretching forces are required to produce thinner than equilibrium glass. Longitudinal stretching forces applied to the glass ribbon produce thinner than equilibrium glass, but also result in an undesirable decrease in ribbon width. Methods have therefore been developed to control the width of the glass ribbon while longitudinal stretching occurs by employing devices which engage opposite marginal edges of the ribbon to exert lateral retaining and stretching forces thereto.

In order to produce flat glass, and particularly thin flat glass, having acceptable optical quality it is desirable to produce a uniform stress field in the glass ribbon. "Uniform stress field" as used herein refers to a condition where stress in the ribbon remains constant laterally across the ribbon at any selected location and changes longitudinally along the ribbon in a relatively smooth gradual manner, thus minimizing local variations in the stress field. Two important factors which affect the uniformity of the stress field in the glass are:
  (a) the manner in which the retaining and stretching forces are applied to the ribbon; and
  (b) viscosity gradients that exist in the ribbon.

Because heat is more quickly conducted away from the marginal edge portions than the central portions, the glass ribbon generally exhibits an undesirable transverse temperature variation with a corresponding undesirable viscosity profile. Stress produced by an applied force is directly proportional to the viscosity of the ribbon at each point. The stress field therefore differs between the marginal edge portions and the central portions of the ribbon when lateral forces are applied to the marginal edge portions thereof.

U.S. Pat. No. 3,709,673 to Bishop, U.S. Pat. No. 3,929,444 to May et al, and U.S. Pat. No. 3,998,616 to Farabaugh each teach devices in which an elongated barrel is extended through a side wall of the float chamber over the pool of molten metal. A rotatable wheel, e.g. an edge roll, is mounted on one end of the barrel and engages the upper marginal edge of a glass ribbon to apply lateral and longitudinal tractive forces thereto to control the ribbon width. The other end of the barrel is supported outside the float chamber on convenient support mechanisms.

Although these devices are useful in controlling ribbon width, there are limitations associated with each because they apply lateral and longitudinal tractive forces at points approximately 10 feet apart along opposite marginal edges of the ribbon. The ribbon tends to be wide near the points of application of force with relatively high stress, and narrow between these points with relatively low stress, thus adopting a scalloped or undulatory configuration. This point application of force thus causes further nonuniformity in the stress field of the ribbon by introducing longitudinal variations therein. It is desirable therefore to apply lateral forces as closely together as possible along the marginal edge portions of the ribbon to approach a solid line of applied force, to improve stress field uniformity and obviate ribbon scalloping.

The prior discussed devices are unable to operate in the preferred close proximity for several reasons. First, the support mechanisms for the elongated barrels are generally wide, thus limiting how closely the barrels may be positioned. Secondly, in order to exert lateral forces to the ribbon with the edge rolls, the barrels must be inserted into the float chamber at an angle which is downstream of a line normal to the glass movement direction. This angular positioning further limits how closely the rotatable wheels can be spaced along the marginal edge portions of the ribbon. Further, the devices are limited because to increase the lateral component of the force applied by the edge roll, the downstream barrel angle must be increased by rotation about a pivot point located outside the chamber near the support mechanism. Any change in barrel angle results in considerable change in the position of the edge roll in relation to the ribbon, a condition which is preferably avoided due to ribbon perturbations and stress field variations which may result.

U.S. Pat. No. 3,520,672 to Greenler et al teaches an edge-engaging apparatus for producing float glass which uses multiple adjacent edge rolls, each mounted upon individual elongated barrels which extend through a side wall of the float chamber over the pool of molten metal. Greenler teaches that the edge rolls are driven at equal speeds by a common motor and drive chain positioned on the support mechanism outside the float chamber, and also that the edge rolls are driven at a linear speed that is increased towards the discharge end to maintain the ribbon under longitudinal tension to prevent buckling. Although this device allows for close proximity of edge rolls within the chamber, it has limitations. The support mechanism for this device occupies considerable space along the side wall of the float chamber, and greatly limits access thereto for maintenance and inspection. Further, Greenler fails to teach that the angle of each barrel can be changed to vary the force components exerted by the edge rolls. Still further, each individual barrel acts as a heat sink along the marginal edges of the float chamber, thus aggravating the already undesirable transverse temperature gradient and increasing nonuniformity in the stress field of the ribbon.

It would be advantageous to have an edge-engaging device which avoids the limitations of the previously discussed devices.

SUMMARY OF THE INVENTION

The instant invention provides a device for establishing and maintaining a desired thickness and width for a flat glass ribbon of thinner than equilibrium thickness by conveniently exerting a plurality of closely spaced tractive forces to the marginal edge portions thereof while it is moving over and supported upon a pool of molten metal. The device includes an outer elongated member, e.g. an elongated barrel, one end of which is insertable into the chamber and has operatively attached thereto at least two spaced-apart facilities for applying discrete tractive forces to the marginal edge of the glass when engaged thereto. For example, at least two rotatably mounted edge rolls are operatively connected to the insertable end of the barrel to engage the glass and exert tractive forces thereto. Thus, the invention improves stress field uniformity and reduces scalloping in the glass ribbon by providing a plurality of closely-spaced tractive forces which approximate a solid line of applied force. This is accomplished without aggravating the transverse temperature gradient of the ribbon by providing a plurality of edge rolls supported upon a single barrel, thus mitigating the heat sink problem previously discussed.

The instant invention also provides a glass edge engaging device having an edge roll supported near the end of a barrel which is rotated about an axis forming a non-parallel angle with the longitudinal center line of the barrel. This angular relationship permits the insertion of adjacent barrels into the chamber normal to the glass movement direction, with each edge roll rotating about an axis downstream of the barrel direction to provide the desired longitudinal and lateral components of force. Because the barrels need not be angled into the bath, edge rolls can be more closely spaced within the chamber, or alternatively, barrel support mechanisms outside the chamber will occupy less sidewall space.

The instant invention further provides facilities for controllably adjusting the angle between the axis of rotation of the edge roll and the longitudinal center line of the barrel to change the lateral and longitudinal components of the tractive force applied to the glass. By providing edge rolls which are angularly adjustable about a point near the end of the barrel, the invention permits horizontal angular adjustments of the edge rolls to change components of the tractive force without causing a substantial change in position of the edge roll, thus avoiding ribbon perturbations and stress field variations which otherwise result. Vertical angular adjustment of the edge rolls is also made possible, to change the depth of engagement between the edge rolls and ribbon without requiring barrel movement.

The invention further provides an edge-engaging device having a plurality of edge rolls at least one of which is rotated about an axis forming non-parallel angle with the longitudinal center line of the barrel, and is angularly adjustable thereto.

DESCRIPTION OF THE INVENTION

Figure 1:
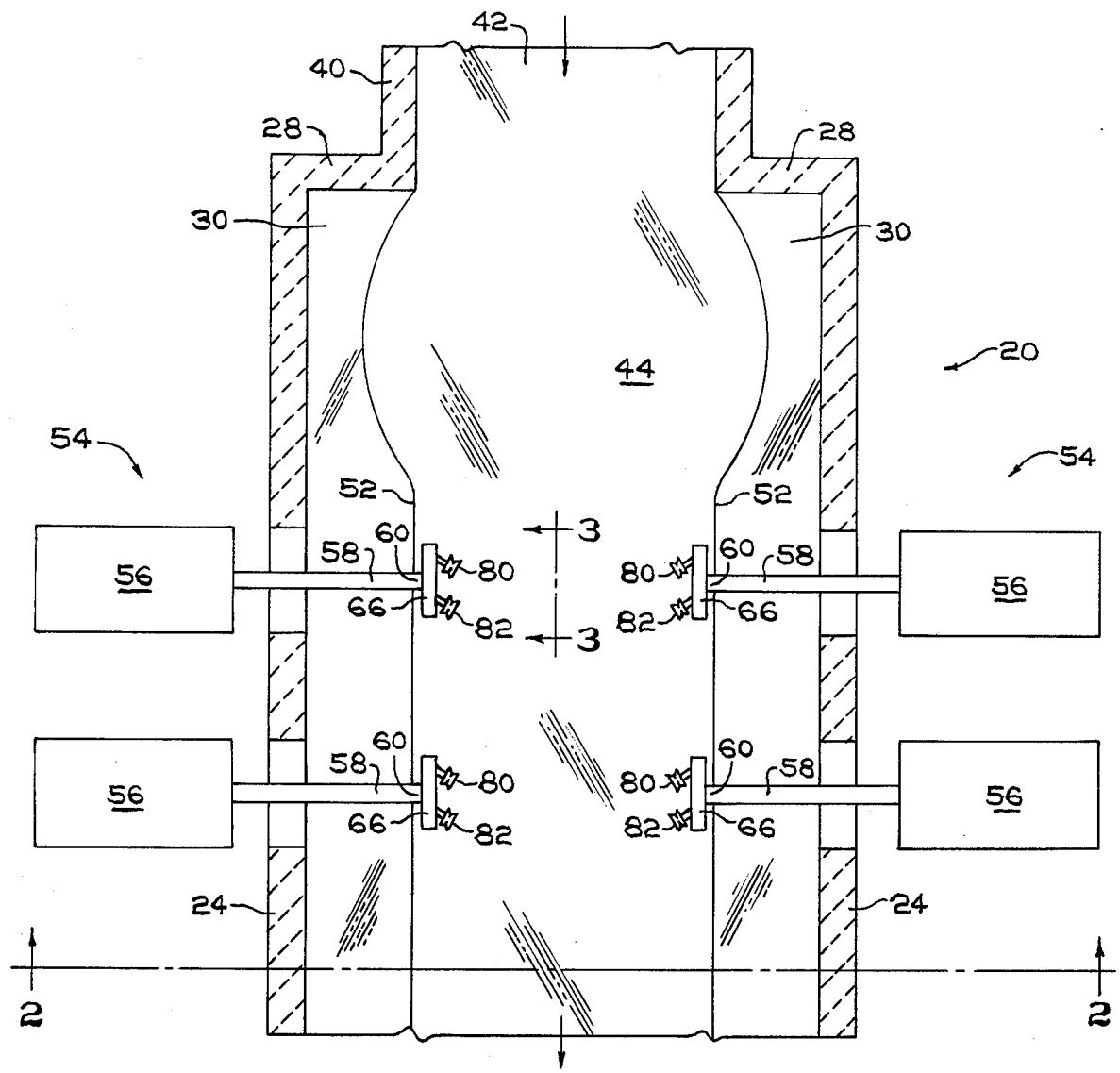
FIG. 1 is a fragmented plan view of a float chamber having portions removed for purposes of clarity illustrating edge-engaging devices incorporating features of the present invention.
Figure 2:
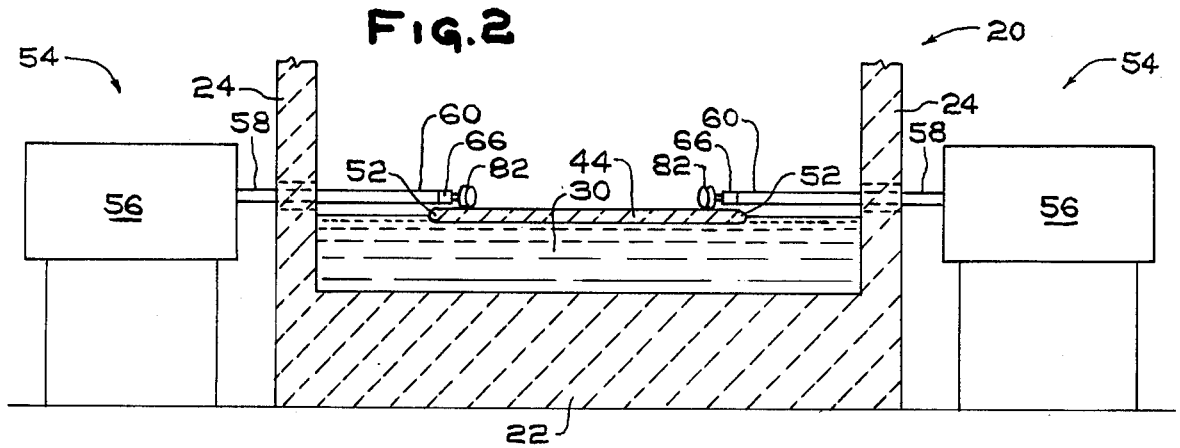
FIG. 2 is a view taken along lines 2—2 of FIG. 1.

Referring to FIG. 1, there is shown a section of the interior of a float chamber 20 of the type known in the glass manufacturing art. As illustrated in FIGS. 1 and 2, the chamber 20 includes a refractory bottom 22, refractory side walls 24, refractory exit lip (not shown), and refractory back walls 28 to form a container for containing a pool 30 of supporting molten metal, e.g., tin or an alloy of tin.

The chamber 20 is connected to a delivery channel 40 through which molten glass 42 is moved at a controlled rate in any convenient manner onto the pool 30 of molten metal to form a body of hot glass 44 on the molten metal pool 30. As the body of hot glass 44 moves downstream from the delivery channel 40 in the direction of the arrow it undergoes attenuation and cooling to form a dimensionally stable glass ribbon.

As will be appreciated, the instant invention is not limited to any particular type of forming chamber, the preceding being included to present an example environment in which the invention may be practiced.

"Attenuation" as used herein is defined as a controlled reduction in glass thickness accomplished by applying longitudinal and lateral forces to the marginal edges 52 of the body of hot glass 44 as the body of hot glass 44 moves downstream through chamber 20. Reduction in glass thickness may be accomplished with or without change in ribbon width.

Figure 4:
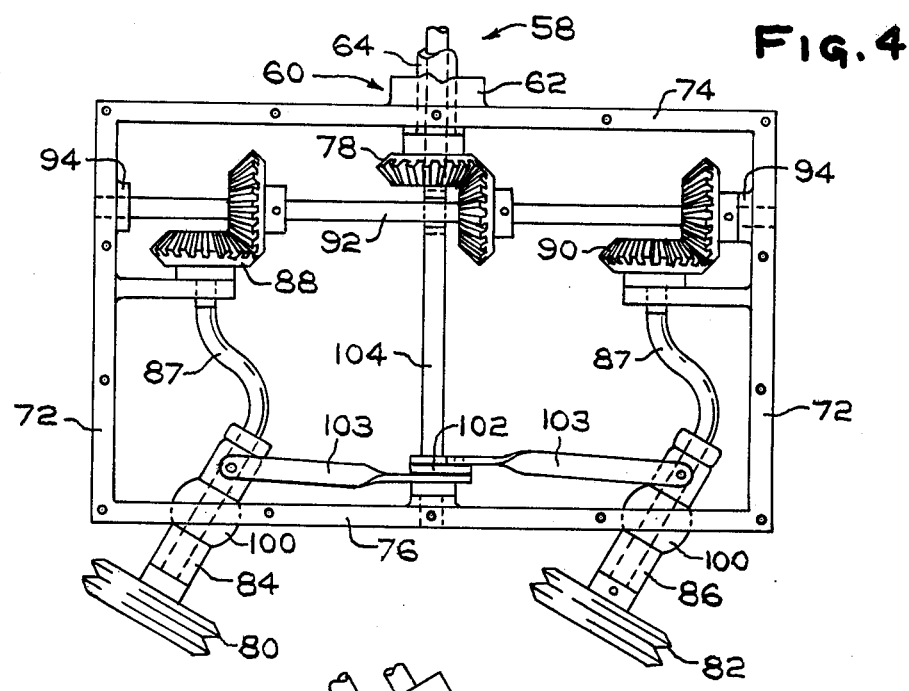
FIG. 4 is a sectional view taken along line 4—4 of FIG. 3 with portions removed for purposes of clarity.

Referring to FIG. 1, edge-engaging device 54 incorporating features of the invention engage the marginal edge 52 of the body of hot glass 44, to establish and maintain a desired width and thickness of same. The edge-engaging devices 54 may be used to maintain the body of hot glass 44 at a thickness greater than or less than equilibrium thickness, but they are particularly beneficial in making glass of less than equilibrium thickness. The edge-engaging device 54 includes a structural support carriage 56 positioned outside the chamber 20 having movably mounted thereto one end of an elongated member 58 which extends through side wall 24 of chamber 20 over the pool 30 of molten metal. Referring to FIGS. 1 and 2, the elongated member 58 is mounted to the structural support carriage 56 in a manner which permits controllable adjustment of the position of the extended end 60 of elongated member 58 in all spatial directions. Mounting can be accomplished in any convenient manner, for example, by the teachings of U.S. Pat. No. 3,709,673 to Bishop, U.S. Pat. No. 3,929,444 to May et al, or U.S. Pat. No. 3,998,616 to Farabaugh, which teachings are herein incorporated by reference. As shown in FIG. 4, preferably the elongated member 58 is a tubular, fluid-cooled member having an outer tubular housing 62 and an inner rotatable hollow drive shaft 64 such as taught in U.S. Pat. No. 3,709,673 to Bishop, which teachings are hereby incorporated by reference herein.

Figure 3:
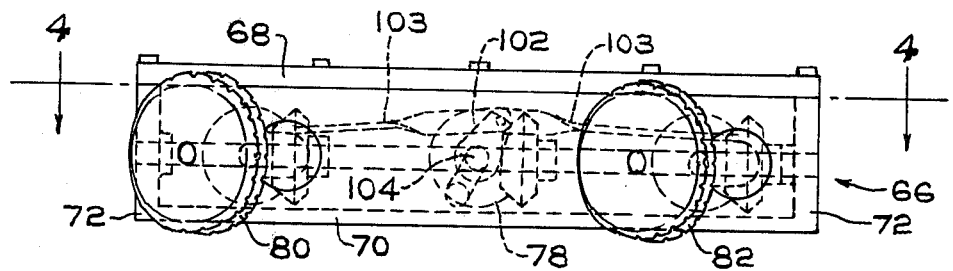
FIG. 3 is an enlarged elevational view taken along line 3—3 of FIG. 1.

Referring to FIGS. 3 and 4, a gear housing 66 is mounted at the extended end 60 of the elongated member 58 and communicates therewith in a manner and for purposes to be discussed below. The gear housing 66 is formed of a top wall 68, a bottom wall 70, side walls 72, a back wall 74 and front wall 76, which are interconnected to form a hollow chamber. The outer tubular housing 62 of elongated member 58 is rigidly attached to the exterior of back wall 74. The inner hollow drive shaft 64 of elongated member 58 extends into the interior of gear housing 66 and is rigidly attached therein to drive gear 78.

Edge rolls 80 and 82 are rotatably attached to front wall 76 by hollow shafts 84 and 86 respectively, which extend therethrough into the interior of gear housing 66. As illustrated in FIG. 3, the edge rolls 80 and 82 rotate through a circular path having a portion below bottom wall 70 to engage the glass ribbon.

Interior ends of hollow shafts 84 and 86 are operatively connected by flexible drive shafts 87 to gears 88 and 90 respectively, which in turn are operatively connected to drive gear 78 by geared shaft 92. As shown in FIG. 4, geared shaft 92 is rotatably mounted between drive gear 78 and gears 88 and 90 by bushings 94, and effectively transfers driving force from drive gear 78 to glass-engaging wheels 80 and 82. The drive gear 78 is driven by the rotation of inner hollow shaft 64, which in turn is driven by a motor (not shown) positioned outside the float chamber on structural support carriage 56.

Hollow shafts 84 and 86 are conveniently mounted in front wall 76 to allow rotary motion about their longitudinal center lines, and also to permit angular adjustment of their longitudinal axis in relation to the front wall 76 and/or to the longitudinal center line of the elongated member 58. For example and with continued reference to FIGS. 3 and 4, hollow shafts 84 and 86 may be mounted within front wall 76 by ball and socket assemblies 100 which provide a bearing surface for free rotation therein and permit angular adjustment of the hollow shafts 84 and 86. A pivotally mounted linkage assembly 102 links connecting rods 103 and a pivotally mounted control rod 104 to operatively connect the interior ends of the hollow shafts 84 and 86 for coordinated angular adjustment from outside the chamber side wall. Flexible drive shafts 87 acting in cooperation with ball and socket assemblies 100 permit hollow shafts 84 and 86 to rotate within a range of angular relationships with respect to the longitudinal center line of elongated member 58, the particular angular relationship selectively controllable by adjustment of linkage assembly 102, connecting rods 103, and control rod 104.

Although not limiting to the invention, the edge engaging device 54 may be fluid cooled as taught in the Bishop patent. For example, drive gear 78 and gears 88 and 90 may have hollow centers, and cooling fluid may be conveniently directed through drive shaft 64 into gear housing 66, directed into and out of edge rolls 80 and 82, and removed through the area between the outer tubular housing 62 and the drive shaft 64.

Edge rolls 80 and 82 may engage the top surface of the ribbon as taught in the above-referenced Bishop patent, or as taught in U.S. Pat. No. 3,661,548 to Ito et al, which teachings are herein incorporated by reference. Alternatively, the edge rolls 80 and 82 may engage the bottom surface of the ribbon, as taught in U.S. Pat. No. 3,533,772 to Itakura et al, which teachings are herein incorporated by reference. Although not limiting to the invention, the preferred edge rolls are top edge rolls as described in the Bishop patent and as shown in FIGS. 1-4.

Figure 5:
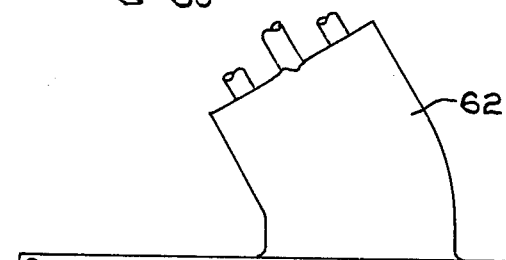
Fig. 5 is a view similar to FIG. 4 illustrating an alternative embodiment of the present invention.
Figure 5:
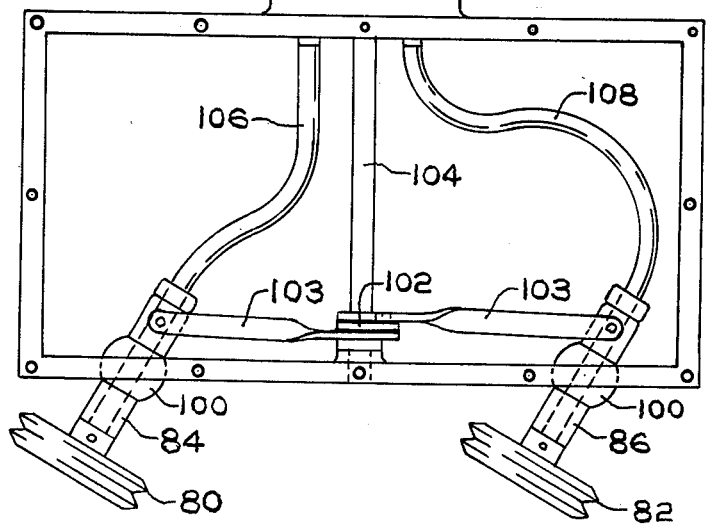

With reference to FIG. 5, an alternate embodiment of the instant invention is shown. A pair of elongated flexible drive shafts 106 and 108 are disposed within outer tubular housing 62 to drive edge rolls 80 and 82 respectively. The flexible drive shafts 106 and 108 are capable of transmitting driving force over a nonlinear path, and may be of the type sold by the S. S. White Industrial Products Company of Piscataway, N.J. as No. 3×NN23. This embodiment of the invention features greater mechanical simplicity than the previously discussed embodiment, and is preferred if the other tubular housing 62 is non-linear (as shown in FIG. 5). Alternatively, a gear housing 66 such as shown in FIG. 4 can be driven by a flexible drive shaft in lieu of rigid drive shaft 64.

Referring now to FIGS. 1 and 2, in a preferred mode of installation a pair of edge engaging devices 54 are inserted simultaneously from opposite sides of the chamber 20, and if more than one pair are to be used, installation is begun at the most upstream pair. The discussion to follow will relate to the installation of a single-edge engaging device 54, it being understood that similar steps are simultaneously enacted upon the other one of the opposed pair.

Prior to insertion, the cooling system of the device 54 should be checked for proper fluid flow, after which appropriate openings are made in the sidewall 24 by removing side seal members. The elongated member 58 is inserted into the chamber substantially normal to the glass movement direction, and edge rolls 80 and 82 are energized to rotate at a peripheral speed approximately equal to the linear speed of the ribbon at that location and in a direction substantially parallel to the marginal edge thereof. Edge rolls 80 and 82 are then biased lightly against the upper surface of the ribbon.

After engagement, the peripheral speed and the depth of engagement of edge rolls 80 and 82 are generally increased to exert the desired longitudinal tractive force to the ribbon. Thereafter, the axis of rotation of edge rolls 80 and 82 is adjusted (generally in a direction downstream of a line normal to the direction of ribbon movement, to supply a lateral stretching force) while maintaining elongated member 58 stationary, and the peripheral speed is again adjusted correspondingly to maintain the previously established longitudinal component. In this configuration, edge rolls 80 and 82 exert both longitudinal and lateral forces to the glass 44 when driven by the drive gear 78. Longitudinal forces are exerted to attenuate the ribbon, and lateral forces are exerted to resist the ribbon's natural narrowing tendency and to control the ribbon width. As can be appreciated, the lateral component of the tractive force may be increased, and the longitudinal component of the tractive force correspondingly decreased, by increasing the downstream angle of the axis of rotation of the edge rolls 80 and 82. In previous edge-engaging devices this angle change was produced by pivoting the barrel about a point outside the float chamber. The large distance between pivot point and edge roll caused a considerable change in position of the edge roll with respect to the ribbon, with resulting perturbations and stress field variations in the glass. The present invention provides for pivoting the edge roll about a point near the front wall 76 of housing 66, thus causing only a slight position change in the edge roll and effectively eliminating said difficulties.

Edge rolls 80 and 82 may be positioned at equal angles with respect to the elongated member 58, or may by adjustment of linkage 102 and rod 103 be operated at different angles with respect thereto. Alternatively, edge rolls 80 and 82 may be angularly operated independently of one another by providing multiple linkages and control rods. Further, edge rolls 80 and 82 may be pivoted in a vertically oriented plane with respect to the elongated member 58 to vary their depth of engagement with the ribbon.

Although not limiting to the instant invention, the edge engaging device 54 may be advantageously employed in a manner taught in U.S. patent application Ser. No. 174,481 filed even date in the name of Charles K. Edge, entitled, "Method and Apparatus for Attenuating Float Glass" to exert substantially equal forces to the ribbon with each of the edge rolls 80 and 82, thus improving the uniformity of the stress field.

To accomplish this it is generally necessary to incrementally increase the peripheral velocities of the edge rolls towards the downstream direction, because the ribbon is generally accelerated in the downstream direction. Different peripheral velocities can be conveniently established by providing edge rolls which have different circumferential dimensions rotating at equal angular velocities, or alternatively, by providing edge rolls having equal circumferential dimensions rotating at different angular velocities. The latter alternative may be accomplished by providing different gear ratios within the gear housing 66 for driving the edge rolls.

More particularly, substantially equal forces can be exerted upon the ribbon by engaging the marginal edge portion thereof with the edge roll 80 which is rotated with a peripheral velocity a preselected amount greater than the linear velocity of the ribbon just upstream of the point of engagement. Edge roll 82 is then rotated with a peripheral velocity the same preselected amount greater than the peripheral velocity of edge roll 80. In practice, the preselected variant in peripheral velocity is preferably about 5%–10%, depending upon the distance between adjacent edge rolls. As the instant invention is not intended to be limited to only two operatively interconnected edge rolls, nor by the specific embodiments described herein, reference must be made to the claims which follow.

I claim:

1. In an apparatus for attenuating a glass ribbon supported upon a pool of molten metal within a chamber, the apparatus of the type having a pair of adjacent elongated fluid cooled members each supporting a single edge engaging device which engages a preselected area of the marginal edge portion of said ribbon, wherein each of said elongated fluid cooled members and its corresponding edge engaging device extracts a quantity of heat from the marginal edge portion of said ribbon to undesirably affect the transverse temperature profile of said ribbon, the improvement comprising:
   a single elongated barrel having a first end portion and a second end portion;
   a pair of edge roll wheels;
   means for mounting said pair of edge roll wheels in spaced relation to one another and to the first end portion of said single elongated barrel to engage an area of said marginal edge portion greater than said preselected area engaged by either one of said edge engaging devices;
   means for supporting said second end portion of said single elongated barrel outside said chamber;
   means for cooling said single elongated barrel, said mounting means, and said pair of edge roll wheels wherein the heat extracted from said marginal edge portion by said single elongated barrel, mounting means, and pair of edge roll wheels is less than the sum of the heat extracted from said marginal edge portion by said pair of adjacent elongated fluid cooled members and corresponding edge engaging devices, to reduce the effect of the attenuating apparatus on the transverse temperature profile of the ribbon.

2. The apparatus as set forth in claim 1 wherein said supporting means includes means for controlling movement of said first end portion of said barrel in all spatial directions.

3. The apparatus as set forth in claim 2 further comprising:
   means mounted outside said chamber for driving said pair of edge roll wheels.

4. The apparatus as set forth claim 3 further comprising:
   means for rotating at least one of said pair of edge roll wheels about an axis forming a non-parallel angle with the longitudinal center line of said elongated barrel.

5. The apparatus as set forth in claim 4 further comprising:
   means for controllably adjusting said non-parallel angle between said axis of rotation and the longitudinal center line of said elongated barrel.

6. The apparatus as set forth in claim 1 wherein said pair of edge roll wheels exert forces upon the same major surface of said glass ribbon.

7. An apparatus for attenuating a ribbon of glass by which the position of a marginal edge portion of a ribbon of glass which is supported within a chamber and moves downstream therethrough upon a pool of molten metal is controlled to establish and maintain a desired width and thickness of the glass, comprising:
   an elongated member having a first end portion and a second end portion;
   an edge roll;
   means for mounting said edge roll to said first end portion of said elongated member;
   means for rotating said edge roll about an axis of rotation;
   means for pivoting said edge roll to alter the angular relationship between said axis of rotation and the longitudinal centerline of said elongated member; and
   means mounting said second end portion of said elongated member for positioning said edge roll relative to said marginal edge portion of the glass ribbon.

8. The apparatus as set forth in claim 7 wherein said mounting means comprises:
   shaft means rigidly secured near its first end to said edge roll and operatively attached near its second and opposite end to said rotating means; and
   bearing means supporting said shaft means for rotation about said axis of rotation.

9. The apparatus set forth in claim 8 wherein said pivoting means comprises:
   ball and socket means secured near said first end portion of said elongated member to pivotally support said shaft means in relation to said elongated member; and
   elongated rod means operatively attached to said shaft means and moveably mounted to adjust the angular relationship between said shaft means and the longitudinal centerline of said elongated member.

10. The apparatus as set forth in claims 8 or 9 wherein said rotating means comprises a flexible drive shaft.

11. The apparatus as set forth in claim 10 wherein said elongated member and said edge roll are fluid cooled.

12. In a method of attenuating a glass ribbon which is supported within a chamber and advances downstream therethrough upon a pool of molten metal, wherein a pair of adjacent, elongated fluid cooled members each support a single edge engaging device which engages a preselected area of the marginal edge portion of said ribbon, wherein each of said elongated fluid cooled members and its corresponding single edge engaging device extracts a quantity of heat from the marginal edge portion of said ribbon and thereby undesirably affects the transverse temperature profile of said ribbon, the improvement comprising the steps of:

mounting a pair of edge roll wheels to the first end portion of a single elongated barrel in spaced apart relationship;

supporting a second end portion of the single elongated barrel outside the chamber to position said pair of edge roll wheels to engage an area of the marginal edge portion of the ribbon greater than the preselected area engaged by each of said edge engaging devices; and cooling the elongated barrel and the pair of edge roll wheels, wherein the heat extracted from said marginal edge portion by said single elongated barrel and said pair of edge roll wheels is less than the sum of the heat extracted from said marginal edge portion by said pair of adjacent elongated fluid cooled members and corresponding edge engaging devices, to minimize the effect of the attenuating method upon the transverse temperature profile of the ribbon.

13. A method of adjusting the position of a marginal edge portion of a ribbon of glass which is supported within a chamber and moves therethrough upon a pool of molten metal comprising:

rotatably mounting at least one edge roll about an axis of rotation upon a first end portion of an elongated member;

inserting said edge roll and said first end portion within said chamber adjacent said ribbon;

engaging the marginal edge portion of said ribbon with said edge roll to exert a tractive force thereto; and pivoting said edge roll in a horizontal plane while maintaining said elongated member in a stationary position to alter the angular relationship between said axis of rotation and said elongated member, to adjust the direction of said tractive force to adjust the position of said marginal edge portion.

14. The method as set forth in claim 13 further comprising the step of:

pivoting said edge roll in a vertical plane while maintaining said elongated member in a stationary position to alter the angular relationship between said axis of rotation and said elongated member to adjust the magnitude of said tractive force to adjust the position of said marginal edge portion.

* * * * *